United States Patent

Senda et al.

Patent Number: 5,590,887
Date of Patent: Jan. 7, 1997

[54] SEALING APPARATUS

[75] Inventors: Masanobu Senda; Yasuhiko Ogisu; Toshikazu Funahashi, all of Aichi-ken, Japan

[73] Assignee: Toyoda Gosei Co., Ltd., Japan

[21] Appl. No.: 169,666

[22] Filed: Dec. 21, 1993

[30] Foreign Application Priority Data

Dec. 22, 1992 [JP] Japan .................................. 4-342612

[51] Int. Cl.$^6$ ...................................... F16J 15/32
[52] U.S. Cl. ........................ 277/205; 277/229; 427/536
[58] Field of Search ......................... 277/205, 227, 277/229, 1; 264/22; 427/536, 490, 575

[56] References Cited

U.S. PATENT DOCUMENTS

| | | | |
|---|---|---|---|
| 2,360,734 | 10/1944 | Smith | 277/229 |
| 3,177,781 | 4/1965 | MacFarlane | 277/229 |
| 3,788,654 | 1/1974 | Mandley | 277/229 |
| 4,076,262 | 2/1978 | Deventer | 277/229 |
| 4,361,596 | 11/1982 | Dukhovskoi et al. | 427/536 |
| 4,791,012 | 12/1988 | D'Agostino et al. | 427/490 |
| 5,041,304 | 8/1991 | Kusano et al. | 427/41 |
| 5,112,025 | 5/1992 | Nakayama et al. | 427/490 |
| 5,162,441 | 12/1992 | Nakata et al. | 525/194 |
| 5,244,730 | 9/1993 | Nguyen et al. | 427/490 |
| 5,284,543 | 2/1994 | Kusano et al. | 427/490 |

FOREIGN PATENT DOCUMENTS 2-60901  3/1990  Japan .

*Primary Examiner*—Thomas B. Will
*Assistant Examiner*—John L. Beres
*Attorney, Agent, or Firm*—Cushman Darby & Cushman, IP Group of Pillsbury Madison & Sutro, LLP

[57] ABSTRACT

A sealing apparatus, which provides a seal between a metal surface and a member sliding along the metal surface is made of rubber material which contains a rubber polymer having alkyl lateral chains. At least a part of alkyl group hydrogen of rubber polymer in cortex is substituted from fluorine by plasma treatment. The plasma treatment reduces the noise which is normally present in device as of this type.

2 Claims, 4 Drawing Sheets

SEALING APPARATUS

BACKGROUND OF THE INVENTION

The Priority Document, Japanese Patent Application No. Hei4-342612 filed in Japan on Dec. 22, 1992 is hereby incorporated hereinto by this reference.

1. Field of the Invention

The present invention relates to a sealing apparatus. Particularly, the present invention relates to the sealing apparatus which can reduce the noise occurring from the sliding of a piston and the like.

2. Description of the Art

Conventional sealing apparatus are described in U.S. Pat. No. 5,162,441 and Japanese Patent Publication No. Hei2-60901.

One such conventional sealing apparatus such as a piston cup is made of a rubber compound such as ethylene propylene rubber (EPDM), and the hydraulic fluid tightness (basis of the hydraulic oil is a variety of glycol) of the EPDM is high.

However, when the rubber compound is mounted on a piston, noise was likely to result. The noise is caused by vibration which results from the inner wall cylinder sliding well with other apparatus. The noise occurs mainly in the 500–2500 Hz range.

it is an object of the present invention to provide a sealing apparatus which reduces the sliding noise.

To reduce the sliding noise, the sealing apparatus is made of rubber compounds which the rubber polymer includes alkyl lateral chain, and at least a part of alkyl group hydrogen, of a rubber polymer in the cortex, is substituted by fluorine.

Other objects, features, and characteristics of the present invention, as well as the method of operation and functions of the related elements of the structure, and the combination of parts and economies of manufacture, will become apparent upon consideration of the following description and the appended claims with reference to the accompanying drawings, all of which form a part of this specification, wherein the same reference numerals designate corresponding parts in the various figures.

SUMMARY OF THE INVENTION

DETAILED DESCRIPTION OF THE PREFERRED EMBODIMENTS

As noted above, a sealing apparatus of the present invention is made of rubber compound in which a rubber polymer has alkyl lateral chains. When the rubber polymer does not have alkyl lateral chains, displacement of hydrogen by fluorine is not complete, and the benefits of the present invention are lost. As the rubber polymer, crude-rubber, synthetic natural rubber, butyl rubber, silicone rubber may be used.

A feature of the present invention is that at least a part of the alkyl group hydrogen of a rubber polymer in the cortex of a sliding seal is replaced by fluorine. By substituting part of the hydrogen within the alkyl group with fluorine, the coefficient of friction in rubber surface is reduced, and thereby the noise is also reduced. In the present invention, the cortex is 10–1000 nm. It's also effective that only the sliding surface(3) is substituted with fluorine.

The surface of the sealing apparatus is treated with plasma at low-temperature under the existence of fluoride carbon gas. The conditions of the above treatment are as follows.

The quantity of plasma treatment described below is from $1 \times 10^2$ to $1 \times 10^9$ Wsm$^{-3}$, preferably, from $1 \times 10^4$ to $1 \times 10^7$ Wsm$^{-3}$.

[A quantity of plasma treatment]=[microwave plasma spent electric power (W))]×[time(s)]/[Treatment tank volume (m$^3$)]

As the fluoride carbon gas, tetrafluoromethane, hexafluoromethane, octafluorocyclobutane, trifluoromethane may be used.

When the quantity of plasma treatment is under $1 \times 10^2$ Wsm$^{-3}$, the sliding noise is not reduced. When the quantity is over $1 \times 10^9$ Wsm$^{-3}$ the effect of reducing sliding noise reaches the saturation field, and the depth of the surface treatment deepens at the same time. Too deep a surface treatment may adversely effect the character of polymer rubber, e.g., compression, set resistance or plastic character.

EXAMPLE

1. A first example of the present invention will be described in detail hereinafter. The blending proportions are all by weight unless otherwise specified.

Figure 1:
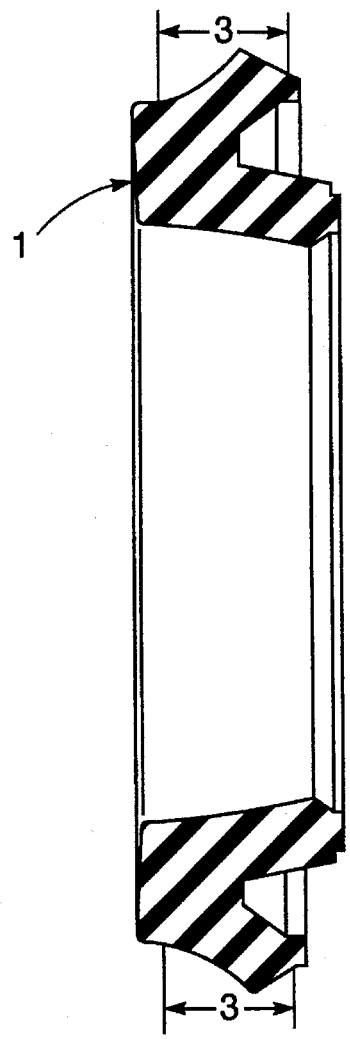
FIG. 1 is a cross-sectional view of a sealing apparatus of the present invention.

(1) A piston cup (1) shown in FIG. 1 was made of EPDM rubber compound by injection, and was cured under the condition of 185° C.×3.5 min. The basic formulation of EPDM rubber was as follows.

| | |
|---|---|
| EPDM | 100 |
| MAF black | 50 |
| Antioxidant | 10 |
| Processing aid | 2 |
| Cure agent | 6 |

(2) The whole surface of piston cup (1) was treated by plasma at low-temperature with microwave plasma apparatus as follows.

a) After the atmospheric pressure in a treatment tank was reduced to 5 Pa, Perfluoroethylene was supplied until the atmospheric pressure became 40 Pa.

b) Low-temperature plasma was excited with microwave generation machine (2.45 GHz, 500 W), and the low-temperature plasma treatment was carried out 10 min., and returned to atmospheric pressure. The quantity of the plasma treatment was $2.5 \times 10^6$ wsm$^{-3}$.

Figure 2:
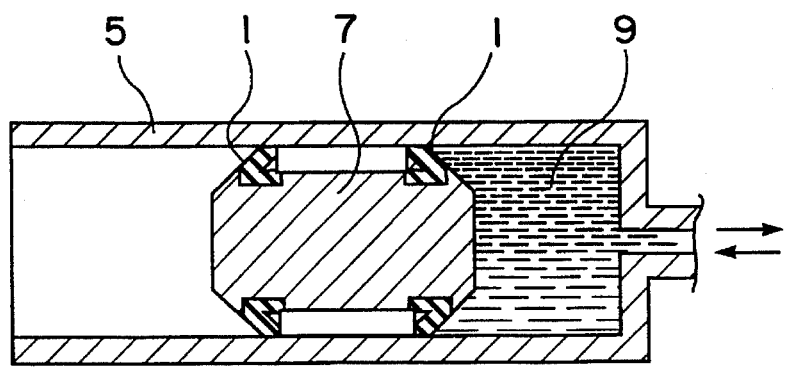
FIG. 2 is a model drawing of cylinder which was used to test sliding noise in the present invention.
Figure 3:
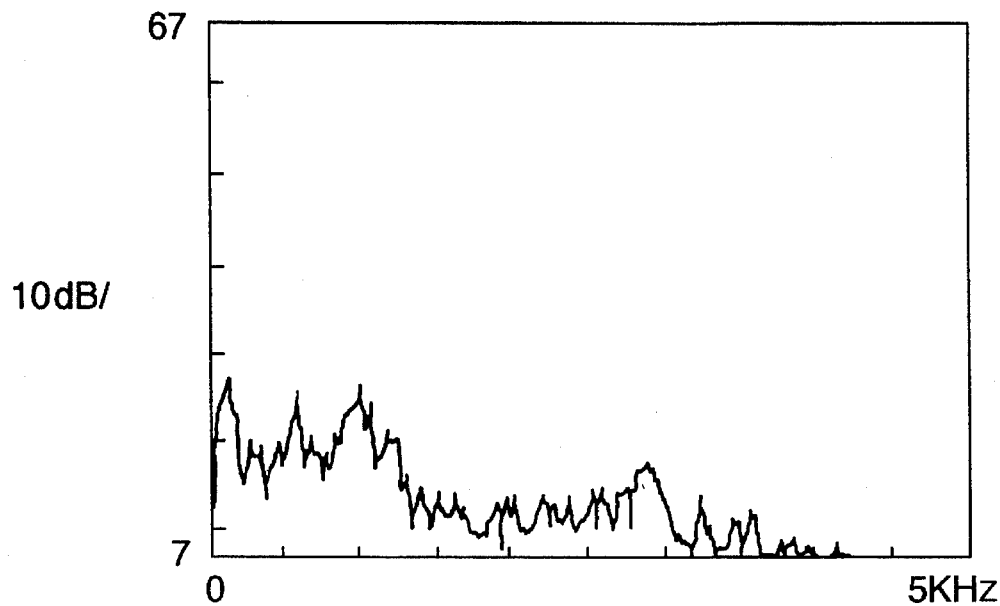
FIG. 3 is a frequency characteristic graph resulting from the sliding noise test of an apparatus treated in the manner of the present invention.
Figure 4:
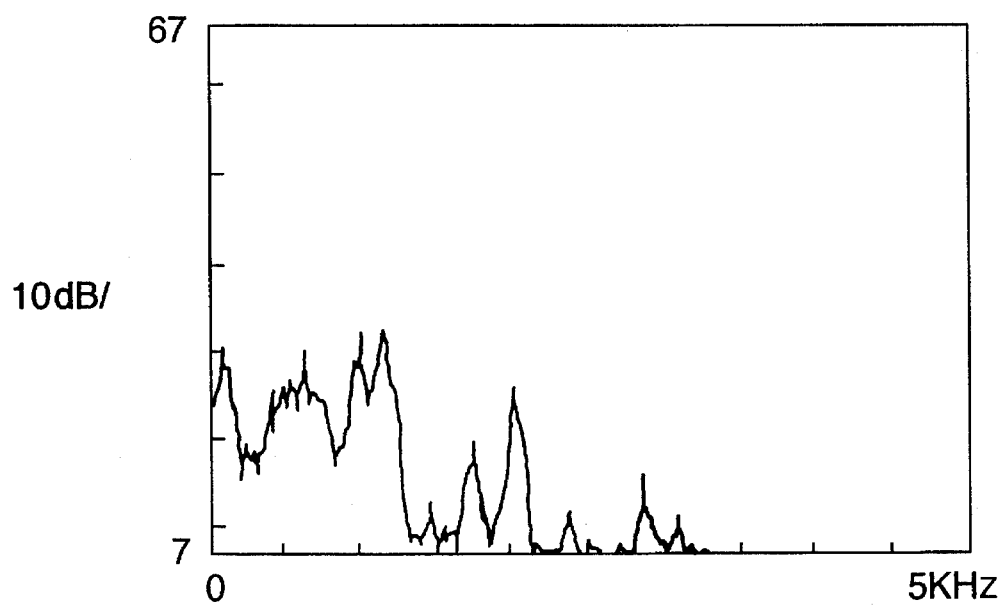
FIG. 4 is a frequency characteristic graph in the sliding noise test of non-treated apparatus in the reference example.
Figure 5:
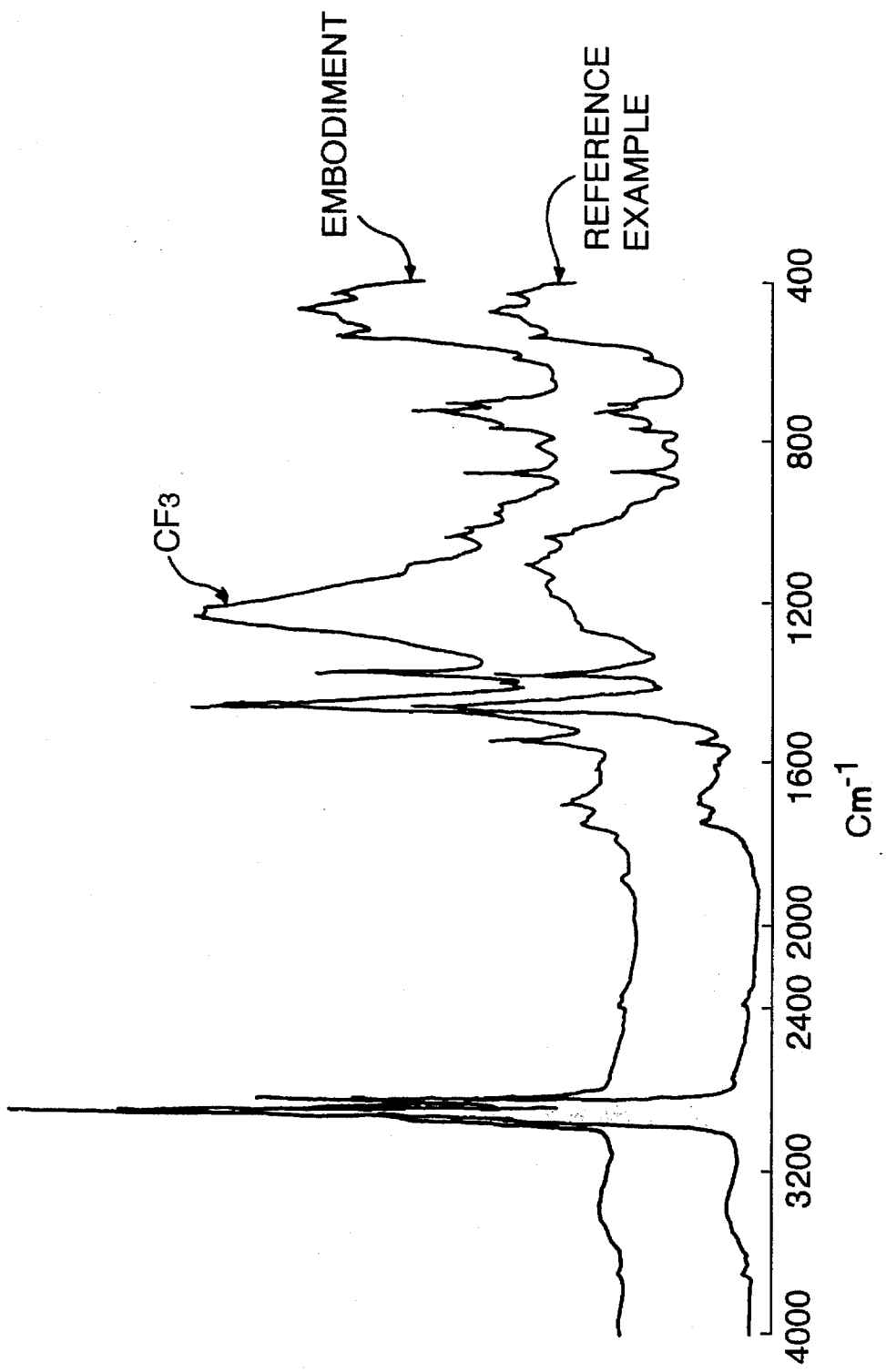
FIG. 5 is a comparison of the infrared absorption spectrum of the surface of sealing apparatus in the embodiment and the reference example.

(3) Treated piston cup (1) and non-treated piston cup (1) of the reference example was installed to a piston (7) of a cylinder (5) shown in FIG. 2, and the piston (7) was moved back and forth 10000 times in 200 mm/sec. Element (9) is brake fluid. After that, the sliding noise was measured as follows.

Generally, when there is a differential of more than 1 in the sensual evaluation, hearing sensibility was clearly evidenced.

The piston (7) in the embodiment was evaluated after the piston was moved back and forth 100 thousand times, 200 thousand times and 400 thousand times under the same conditions. The result of each case was 7, that is, the characteristic of the piston did not vary after long term use.

The reason may be that the resistance to wear of surface was improved by fluorine displacement, and/or fluorine atom of surface was shifted to a companion metal surface by abrasion.

(4) The surface of the piston cup was analyzed by FT-IR, before and after surface treatment with the under conditions.

Using apparatus: FT-IR Spectrometer 1760X

Measuring range: from 4000 $cm^{-1}$ to 400 $cm^{-1}$

A peak (from 1000 to 1400 cm) of fluoride methyl group of the treated apparatus is readily apparent.

Figure 6:
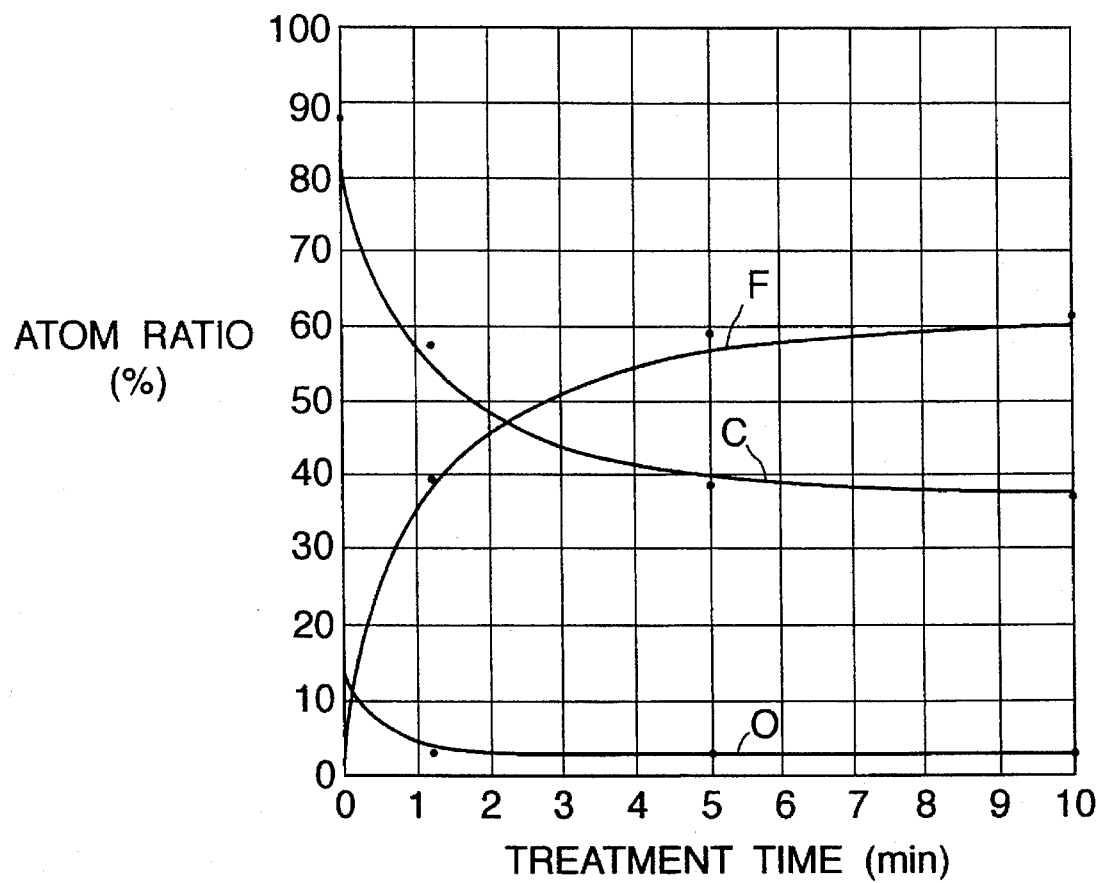
FIG. 6 is a result graph of treatment time dependency measured by the X-ray photoelectron spectroscopy in case where a piston cup is treated by plasma at low temperature.

The treatment time dependency of the cortex element was measured by X-ray photoelectron spectroscopy (Electron Spectroscopy for Chemical Analysis) as shown in FIG. 6.

The fluorine displacement was reached to the general saturation value in a little over 5 min.

2. A second example of the present invention will be described in detail hereinafter. The blending proportions are all by weight unless otherwise specified.

(1) A piston cup (1) shown in FIG. 1 was made of EPDM rubber compound by injection, and was cured under the condition of 185° C.×3.5 min. The basic formulation of EPDM rubber was as follows.

| MAF black | 50 |
| Antioxidant | 2 |
| Processing aid | 2 |
| Cure agent | 6 |

(2) The whole surface of piston cup (1) was treated by plasma at low-temperature with microwave plasma apparatus as follows.

(a) After the atmospheric pressure in a treatment tank was reduced to 5 Pa, Perfluoroethylene was supplied until the atmospheric pressure became 40 Pa.

(b) Low-temperature plasma was excited with microwave generation machine (2.45 GHz, 220 W), and the low-temperature plasma treatment was carried out from 0 to 40 min., and returned to atmospheric pressure as usual.

(3) Treated piston cup (1) and non-treated piston cup (1) of the reference example was installed to a piston (7) of a cylinder (5) shown in FIG. 2, and the piston (7) was moved back and forth 10000 times in 200 mm/sec. Element (9) is brake fluid. After that, the sliding noise was measured as follows.

(a) Sensual evaluation: it was carried out by 10 panelists (adult men: 5, adult women: 5) by 20 incremental evaluation from 1 (worst) to 10 (best) in 0.5 increments (see the Table).

Generally, when there is differential of more than 1 in the sensual evaluation, hearing sensibility was clearly evidenced.

(4) The surface of the piston cup was analyzed by Attenuated Total Reflection (ATE), which is a kind of FT-IR, before and after surface treatment with the under conditions.

| Using apparatus: | FT-IR Spectrometer 1760X made by PERKIN ELMER |
| Using prism: | KRS-5 |
| Measuring range: | from 4000 $cm^{-1}$ to 400 $cm^{-1}$ |
| Test specimen: | 30 × 30 mm, t = 2 mm (sheet form) treated with a sealing apparatus |

The definition of the fluoride ratio was as follows.

$$\text{The fluoride ratio} = \frac{1240 \text{ cm}^{-1} \text{ (CF type peak)}}{1461 \text{ cm}^{-1} \text{ (CH type peak)}} \text{ of ATR Spectra}$$

The fluoride ratio of the first example gotten by this definition was 0.7.

In the rubber component in which the surface was treated in this embodiment, as the sliding resistance to a glass is reduced, the surface treatment of this embodiment may be applied to sliding seal apparatus like as glass run.

TABLE

| TEST SPECIMEN NO. | FLUORIDE RATIO | NOISE LEVEL 30° C. | NOISE LEVEL 60° C. | QUANTITY OF TREATMENT (w = s/m³) |
| --- | --- | --- | --- | --- |
| EXAMPLE 1 | 0.7 | 7 | — | 2.5 × 10⁶ |
| EXAMPLE 2 | | | | |
| 1 | 0 | 5.5–6 | 5.5–6 | 0 |
| 2 | 0.13 | 7 | 6.5 | 2.8 × 10⁵ |
| 3 | 0.47 | 7 | 6.5 | |
| 4 | 0.61 | 7 | 7 | |
| 5 | 0.86 | 7 | 7.5 | |
| 6 | 0.87 | 7–7.5 | 6.5–7 | |
| 7 | 1.07 | 7–7.5 | 7 | |
| 8 | 1.14 | 7 | 7.5 | 2.2 × 10⁶ |
| 9 | 1.32 | 6–6.5 | 5–5.5 | |
| 10 | 1.44 | 6.5 | 5.5–6 | |
| 11 | 1.69 | 6.5 | 6 | |
| 12 | 2.04 | 6.5 | 6 | 4.4 × 10⁶ |

EXAMPLE 1: TREATMENT CONDITIONS/POWER: 500 W, TREATMENT TIME: 10 MIN.)
EXAMPLE 2: TREATMENT CONDITIONS/POWER: 220 W, TREATMENT TIME: 0–40 MIN.)
*TARGET DATA/30° C.: OVER 6.5, 60° C.: OVER 6

What is claimed is:

1. Apparatus for providing a sliding seal between a metal surface and a member sliding along said metal surface comprising:

a seal body formed from an ethylene-propylene polymer having alkyl lateral groups, said seal body being located on said sliding member, said seal body having a sealing portion and an outer surface in sliding contact with said metal surface for sealing between said metal surface and said sliding member, said outer surface having been treated by plasma to a depth from 10 to 1000 nm such that a portion of the hydrogen of the alkyl groups is replaced by fluorine so that the outer surface has a fluoride ratio from 0.1 to 1.2.

2. The apparatus according to claim 1, wherein the quantity of said plasma treatment is from $1×10^4$ to $1×10^7$ $Wsm^{-3}$.

* * * * *